Patented Nov. 6, 1951

2,574,243

UNITED STATES PATENT OFFICE 2,574,243

TREATMENT OF COLORED COLLOID LAYERS

Ronald Bernard Collins, Robert Charles Morris Smith, and Oliver Edmund Pratt, Ilford, England, assignors to Ilford Limited, Ilford, England, a British company No Drawing. Application May 7, 1946, Serial No. 667,991. In Great Britain May 15, 1945

5 Claims. (Cl. 117—34)

This invention relates to the treatment of coloured colloid layers and in particular to the treatment of such layers for the removal of the colour therefrom.

In British patent applications 16,893/44 and 12,176/45, now United States application Serial Number 614,608, filed September 5, 1945 and now abandoned, and British patent application 12,175/45 and corresponding United States application Serial Number 667,990, filed May 7, 1946, processes are described wherein coloured colloid layers are produced which consist of a water-permeable colloid medium including a dyestuff salt which is of one of two complementary types:

(a) A dyestuff salt which is the reaction product of a dye base or "basic dye" with an anion-surface-active compound (b) A dyestuff salt which is the reaction product of a dyestuff containing acid groups, i. e. an "acid dye," with a kation-surface-active compound.

These dyestuffs are quite firmly held in the colloid layers and are not removed even on prolonged washing with water.

By the terms "anion-surface-active compound" and "kation-surface-active compound" are meant surface-active compounds in which the reduction in surface tension, resultant on their addition to water, is due to the anion or kation respectively.

It has now been discovered, and this forms the basis of the present invention, that such dyes may be substantially entirely removed from the colloid layers by treating the layers with an aqueous solution of a compound which is capable of diffusion through the colloid layer and which forms with the surface-active compound present in the layer a complex which is more stable than the salt formed between the surface-active compound and the dye, and thereafter washing the layers with water.

More particularly the compound employed for the treatment may be a surface-active compound of opposite electrostatic charge to that already present in the layer, i. e. layers containing a dyestuff salt of type (a) above may be treated with a kation-surface-active compound and layers containing a dyestuff salt of type (b) above may be treated with an anion-surface-active compound.

The invention is not, however, limited to these specific classes of compound and the treatment may be effected with compounds which do not have marked surface-active properties, as hereinafter indicated.

In these processes the dyestuff is not destroyed by the treatment, but the dyestuff salt is broken down and the free dyestuff becomes removable by washing with water. The reactions which take place are probably of the type indicated by the equations:

1          $D^+A^- + M^+ \rightarrow AM + D^+$
2          $D^-K^+ + M^- \rightarrow KM + D^-$ where D represents the dyestuff molecule, A and K represent the anion-surface-active and kation-surface-active agents respectively and M represents the compound employed for the treatment. Where the treating compound is itself a surface-active agent the equations may be written:

3          $D^+A^- + K^+ \rightarrow AK + D^+$
4          $D^-K^+ + A^- \rightarrow AK + D^-$ The "discharge" of the dyestuffs by the methods of this invention may be applied where the dyestuff is in a water-permeable colloid layer on the outside of a photographic element, or where it is in a water-permeable colloid layer forming an internal layer of a multilayer photographic element, providing in this latter case that any layers between the dyestuff salt layer and one outside surface of the photographic element are also water-permeable. The general procedure is to bathe the layer containing the dyestuff salt, or the element containing such layer, in an aqueous solution of the treating compound, as indicated above, and then to wash the layer, or element containing it, in water for about half an hour, this being usually sufficient to remove all the dyestuff. A water-permeable colloid layer containing a dyestuff formed from Auramine O, Colour Index No. 655, and sodium alkyl sulphate of 10 to 18 carbon atoms may be treated with a 10% aqueous solution of cetyl pyridinium bromide or cetyl trimethyl ammonium bromide and then washed, or a water-permeable colloid layer containing a dyestuff formed from tartrazine and cetyl pyridinium bromide as described in the said application may be treated with a 10% aqueous solution of sodium alkyl sulphate of 10 to 18 carbon atoms or the sodium salt of an alkyl naphthalene sulphonic acid.

As indicated above, the treating compound need not necessarily have marked surface-active properties, and it is possible to employ, within this invention, compounds which are not generally regarded as surface-active, providing they will permeate the colloid layer and providing they will react with the anion-surface-active agent or kation-surface-active agent present in the layer, to form a more stable compound or complex than the salt formed between the dye and the surface-active agent present in the layer. Suitable other compounds are sodium silico-dodecatungstate, quinine sulphate and caffeine.

The following specific examples illustrate the invention:

Example 1

A coloured colloid layer was produced by coating a solution containing 4% of cetyl trimethyl ammonium bromide and 8% of gelatin on a support, allowing the layer to dry and then bathing it in a 2% solution of tartrazine for 4 minutes, followed by washing in running water for 30 minutes.

This layer was bathed in a 12½% aqueous solution of sodium alkyl sulphate of 10 to 18 carbon atoms for 10 minutes and then washed in running water for 30 minutes. The density of the layer at various stages in the process was measured and the following results obtained:

Density of original layer containing cetyl trimethyl ammonium bromide but no dyestuff _____ 0.11
Density of layer after treatment with tartrazine _____ 1.95
Density of layer:
  (a) After plain washing for 30 minutes _____ 1.92
  (b) After treatment with sodium alkyl sulphate of 10 to 18 carbon atoms followed by 30 minutes' washing_____ 0.17

It will be seen from these figures that while plain washing of the layer had practically no effect on its density, treatment with sodium alkyl sulphate of 10 to 18 carbon atoms, followed by washing, substantially entirely removed the dyestuff, the density of the layer almost reverting to its value before dyeing.

Example 2

An aqueous solution containing 8% gelatin and 2% sodium alkyl sulphate of 10 to 18 carbon atoms was coated to form an interlayer between two standard type silver iodobromide emulsion layers, the whole assembly being carried on a film support. The multilayer material thus formed was bathed in a saturated solution of Auramine 0 for ten minutes and then washed for 30 minutes. It was then found that only the interlayer containing the sodium alkyl sulphate of 10 to 18 carbon atoms had retained any noticeable quantity of the dyestuff, the density of that layer being 1.10.

The multilayer material was then bathed in a 10% solution of cetyl pyridinium bromide for ten minutes and then again washed in running water. It was found that the Auramine 0 had been substantially entirely washed out of the material, the density of the interlayer having substantially returned to its value before the treatment with Auramine 0.

Example 3

A dyed layer was prepared as described in Example 1, of density 1.95.

The layer was bathed in a 10% solution of sodium octyl sulphate for 10 minutes and washed in running water for 30 minutes. The density of the layer was now reduced to 0.15, whereas washing in water only for 30 minutes reduced the density of the layer only to 1.92.

Example 4

A dyed layer was prepared as in Example 1, of density 1.95.

The layer was bathed in a 10% solution of sodium silico-dodecatungstate, $Na_4[SiW_{12}O_{40}].20H_2O$, for 5 minutes and washed in running water for 10 minutes. The density of the layer was reduced to 0.12, whereas washing for 15 minutes in water only reduced it only to 1.93.

Example 5

A coloured colloid layer was produced by coating an 8% solution of gelatin and 2% sodium alkyl sulphate of 10 to 18 carbon atoms, allowing the layer to dry and then bathing it in a ½% solution of Auramine 0 for 4 minutes and washing for 30 minutes in running water. The density of the layer containing sodium alkyl sulphate of 10 to 18 carbon atoms but no dyestuff was 0.11. The density of the layer after treatment with Auramine and washing was 1.30. Portions of the layer were then treated as follows and the densities measured:

(a) Washed for 20 minutes in running water. The final density was 1.22.

(b) Bathed for 10 minutes in a 2% solution of dodecyl pyridinium bromide and washed for 20 minutes. The final density was 0.11.

(c) Bathed for 10 minutes in a 5% solution of quinine sulphate and washed for 20 minutes. The final density was 0.11.

(d) Bathed in a 2½% solution of caffeine for 10 minutes and washed in water for 20 minutes. The final density was 0.14.

(e) Bathed in a 2% solution of dodecyl triethyl ammonium bromide for 10 minutes and washed for 20 minutes. The final density was 0.10.

Thus treatment (a), washing in water only, had practically no effect on the layer, but the treatments described in paragraphs (b) to (e) above substantially entirely remove the Auramine from the layer.

Example 6

A layer formed by coating a solution containing 8% gelatin and 4% cetyl trimethyl ammonium bromide was bathed in a 2% solution of tartrazine for 4 minutes and washed in running water for 30 minutes. It had a density of 2.01. By bathing this layer in a 5% solution of sodium silico tungstate for ten minutes and then washing in water for 20 minutes, or by bathing the layer in a 5% solution of caffeine for ten minutes and washing in water for 30 minutes, the tartrazine was completely removed from the layer.

Example 7

A layer containing sodium alkyl sulphate of 10 to 18 carbon atoms and Auramine was prepared as in Example 2. By bathing this layer for 10 minutes in an aqueous solution of diphenyl guanidine acetate, or in a 5% solution of sodium tannate, followed by washing for 30 minutes in water, the layer was completely decolourised.

The density figures in the foregoing examples were determined in a standard type densitometer, the specimens being viewed through a filter transmitting only between 3800 Å and 5000 Å.

What we claim is:

1. Process for decolorizing a water-permeable colloid layer containing a water-insoluble dye complex formed between a dye and an uncoloured salt selected from the group consisting of (a)

anion-active alkali metal, ammonium and amine salts of long chain sulphonic and sulphuric acids which contain an alkyl radical of at least 8 carbon atoms in the anion, and (b) cation-active alkyl substituted ammonium salts and quaternary salts of heterocyclic nitrogen compounds each of which contains a long chain alkyl radical of at least 8 carbon atoms in the cation, a basic dye being selected when the uncoloured salt is anion-active and an acid dye being selected when the uncoloured salt is cation-active, which comprises treating the layer with an aqueous solution of an uncoloured salt from group (a) when that present in the dye complex is from group (b), and from group (b) when that present in the dye complex is from group (a), and thereafter washing the layer with water.

2. Process for decolorizing a water-permeable colloid layer containing a water-insoluble dye complex formed between a basic dye and an uncoloured salt selected from the group consisting of anion-active alkali metal, ammonium and amine salts of long chain sulphonic and sulphuric acids which contain an alkyl radical of at least 8 carbon atoms in the anion, which comprises treating the layer with an aqueous solution of an uncoloured salt selected from the group consisting of cation-active alkyl substituted ammonium salts and quaternary salts of heterocyclic nitrogen compounds each of which contains a long chain alkyl radical of at least 8 carbon atoms in the cation, and thereafter washing the layer with water.

3. Process for decolorizing a water-permeable colloid layer containing a water-insoluble dye complex formed between an acid dye and an uncoloured salt selected from the group consisting of cation-active alkyl substituted ammonium salts and quaternary salts of heterocyclic nitrogen compounds each of which contains a long chain alkyl radical of at least 8 carbon atoms in the cation, which comprises treating the layer with an aqueous solution of an uncoloured salt selected from the group consisting of anion-active alkali metal, ammonium and amine salts of long chain sulphonic and sulphuric acids which contain an alkyl radical of at least 8 carbon atoms in the anion, and thereafter washing the layer with water.

4. Process for decolorizing a water-permeable colloid layer of a photographic element, said colloid layer being on a support and containing a water-insoluble dye complex formed between a dye and an uncoloured salt selected from the group consisting of (a) anion-active alkali metal, ammonium and amine salts of long chain sulphonic and sulphuric acids which contain an alkyl radical of at least 8 carbon atoms in the anion, and (b) cation-active alkyl substituted ammonium salts and quaternary salts of heterocyclic nitrogen compounds each of which contains a long chain alkyl radical of at least 8 carbon atoms in the cation, a basic dye being selected when the uncoloured salt is anion-active and an acid dye being selected when the uncoloured salt is cation-active, which comprises treating the layer with an aqueous solution of an uncoloured salt from group (a) when that present in the dye complex is from group (b), and from group (b) when that present in the dye complex is from group (a), and thereafter washing the layer with water.

5. Process for decolorizing a gelatin layer of a photographic element, said gelatin layer being on a support and containing a water-insoluble dye complex formed between a dye and an uncoloured salt selected from the group consisting of (a) anion-active alkali metal, ammonium and amine salts of long chain sulphonic and sulphuric acids which contain an alkyl radical of at least 8 carbon atoms in the anion, and (b) cation-active alkyl substituted ammonium salts and quaternary salts of heterocyclic nitrogen compounds each of which contains a long chain alkyl radical of at least 8 carbon atoms in the cation, a basic dye being selected when the uncoloured salt is anion-active and an acid dye being selected when the uncoloured salt is cation-active, which comprises treating the layer with an aqueous solution of an uncoloured salt from group (a) when that present in the dye complex is from group (b), and from group (b) when that present in the dye complex is from group (a), and thereafter washing the layer with water.

RONALD BERNARD COLLINS.
ROBERT CHARLES MORRIS SMITH.
OLIVER EDMUND PRATT.

REFERENCES CITED

The following references are of record in the file of this patent:

UNITED STATES PATENTS

| Number | Name | Date |
|---|---|---|
| 1,954,294 | Heymer | Apr. 10, 1934 |
| 2,019,124 | Evans | Oct. 29, 1935 |
| 2,254,965 | Kling | Sept. 2, 1941 |

FOREIGN PATENTS

| Number | Country | Date |
|---|---|---|
| 550,028 | Great Britain | Dec. 18, 1942 |
| 555,642 | Great Britain | Sept. 1, 1943 |

OTHER REFERENCES

Young and Coons, "Surface Active Agents," 1945, pp. 272 and 280.